(12) United States Patent
Agawa

(10) Patent No.: US 8,559,019 B2
(45) Date of Patent: Oct. 15, 2013

(54) APPARATUS AND METHOD FOR MEASURING DISPLACEMENT, METHOD OF MAKING DIE FOR MOLDING OPTICAL ELEMENT, AND OPTICAL ELEMENT

(75) Inventor: Teppei Agawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/343,899

(22) Filed: Jan. 5, 2012

(65) Prior Publication Data
US 2012/0176628 A1 Jul. 12, 2012

(30) Foreign Application Priority Data
Jan. 12, 2011 (JP) ................ 2011-003581

(51) Int. Cl.
*G02B 13/14* (2006.01)
(52) U.S. Cl.
USPC ........................................ 356/614
(58) Field of Classification Search
USPC ........................................ 356/614
See application file for complete search history.

(56) References Cited

U.S. PATENT DOCUMENTS 5,160,848 A * 11/1992 Saitoh et al. ............... 250/548
8,242,428 B2 * 8/2012 Meyers et al. ............. 250/208.1

FOREIGN PATENT DOCUMENTS

| GB | 783524 A | 9/1957 |
| JP | 62-088555 A | 4/1987 |
| JP | 2005-308605 A | 11/2005 |
| JP | 2010-172987 A | 8/2010 |

* cited by examiner

*Primary Examiner* — Tu Nguyen
(74) *Attorney, Agent, or Firm* — Canon U.S.A., Inc. IP Division

(57) ABSTRACT

A beam splitter splits a laser beam emitted from a laser light source into a first laser beam that travels toward an object and a second laser beam. The second laser beam is received by a second photodetector. The second photodetector is positioned such that the light quantity of the second laser beam incident on the second photodetector is equal to that of the first laser beam incident on a first photodetector. A position calculator calculates displacement of the object relative to the laser light source on the basis of the difference between an output of the first photodetector and an output of the second photodetector.

14 Claims, 6 Drawing Sheets

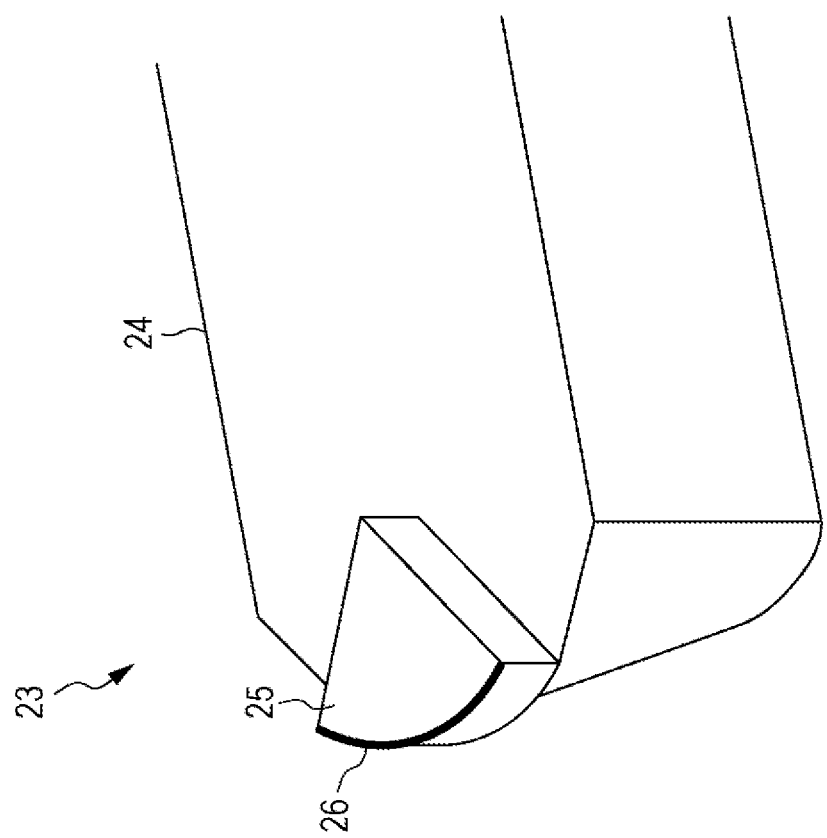

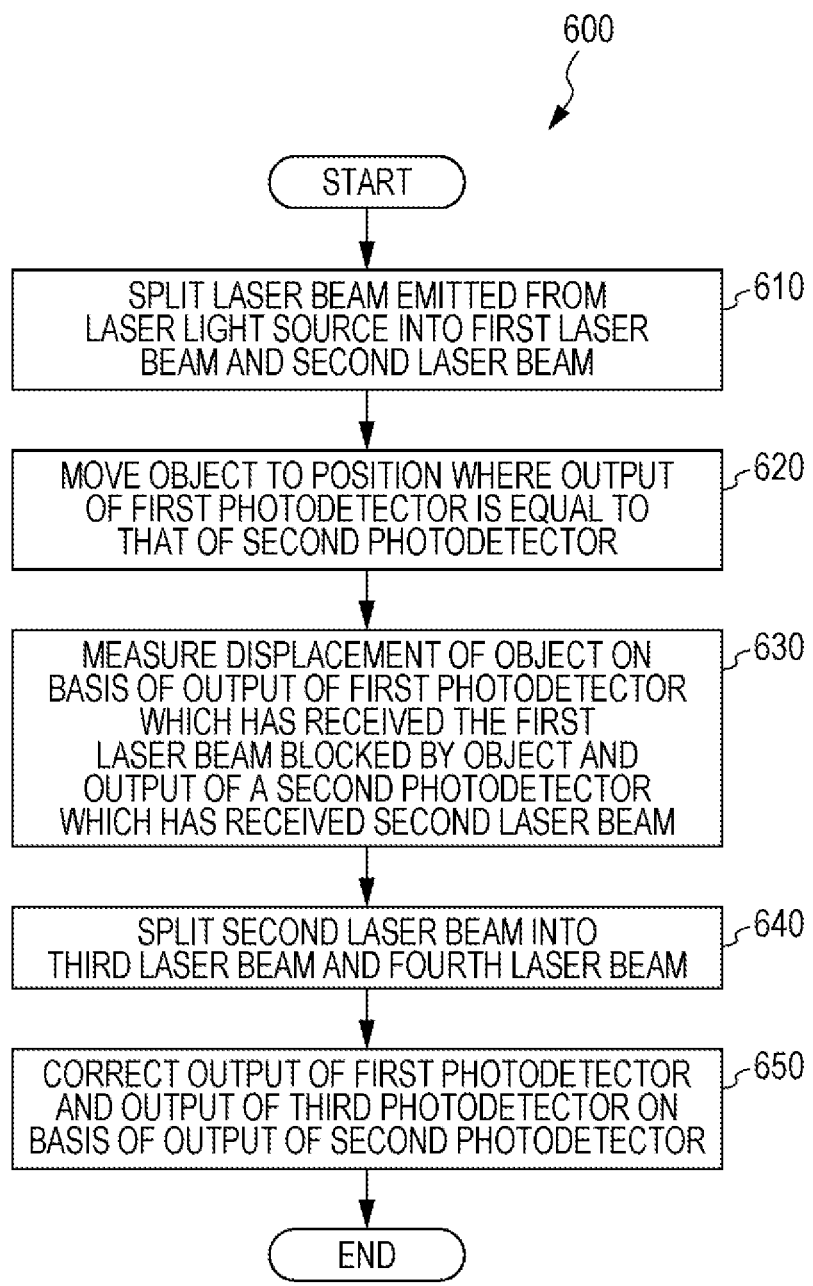

APPARATUS AND METHOD FOR MEASURING DISPLACEMENT, METHOD OF MAKING DIE FOR MOLDING OPTICAL ELEMENT, AND OPTICAL ELEMENT

BACKGROUND OF THE INVENTION

1. Field of the Invention

Embodiments of the present invention relate to an apparatus and method for measuring displacement of an object to be measured (hereinafter, simply referred to as an "object") in a contactless manner, and in particular, relates to measurement of displacement of an object with a laser beam.

2. Description of the Related Art

Processing with, for example, a working machine has required information regarding the position of a tool on the working machine and the shape of the tip of the tool. To determine the position of the tool and the shape of the tip thereof, a workpiece has been subjected to dummy processing and has then been detached from the working machine. Tool marks in the dummy processing have been determined with a measuring device other than the working machine, thus determining the position of the tool on the working machine and the shape of the tip thereof.

According to such a method, after dummy processing, tool marks in the dummy processing are determined outside the working machine. Disadvantageously, this leads to reduction in throughput and wearing away of the tool. In order to overcome the disadvantages, according to some related-art apparatuses and methods, a tool is allowed to block a laser beam and a change in quantity of blocked light is determined, such that displacement of the tool relative to a laser beam source is measured on a working machine in a contactless manner (refer to Japanese Patent Laid-Open No. 62-88555 and No. 2005-308605).

However, the related-art displacement measuring apparatuses and methods for determining a change in quantity of blocked light have such disadvantages that the stability of light quantity (hereinafter, referred to as "light quantity stability") of a laser beam, light quantity distribution thereof, and deflection of the optical axis (hereinafter, referred to as "optical axis deflection") thereof may cause a measurement error.

SUMMARY OF THE INVENTION

One disclosed aspect of the embodiments has been made in consideration of the above-described circumstances. One disclosed aspect of the embodiments provides a displacement measuring apparatus and method capable of reducing measurement errors based on the light quantity stability of a laser beam, light quantity distribution thereof, and optical axis deflection thereof, a method of making a die for molding an optical element, and an optical element.

One disclosed aspect of the embodiments provides a displacement measuring apparatus for measuring displacement of an object to be measured, the apparatus including a laser light source, a beam splitter disposed between the laser beam source and the object, the beam splitter being configured to split a laser beam emitted from the laser light source into a first laser beam that travels toward the object in a first direction and a second laser beam that travels in a second direction different from the first direction, a photodetector configured to receive the first laser beam, a second photodetector configured to receive the second laser beam, and a calculating unit configured to calculate displacement of the object on the basis of an output of the first photodetector which has received the first laser beam blocked by the object and an output of the second photodetector which has received the second laser beam.

One disclosed aspect of the embodiments further provides a method for measuring displacement of an object to be measured, the method including splitting a laser beam emitted from a laser light source into a first laser beam that travels toward the object in a first direction and a second laser beam that travels in a second direction different from the first direction through a beam splitter disposed between the laser light source and the object, and measuring displacement of the object on the basis of an output of a photodetector which has received the first laser beam blocked by the object and an output of a second photodetector which has received the second laser beam.

One disclosed aspect of the embodiments further provides a method of making a die for molding an optical element by cutting the die while moving the die and the cutting edge of a cutter relative to each other on the basis of a processing program, the method including creating the processing program on the basis of the shape of the cutting edge of the cutter determined by the displacement measuring method of one disclosed aspect of the embodiments, and cutting the die while moving the die and the cutter relative to each other on the basis of the created processing program.

One disclosed aspect of the embodiments further provides an optical element molded using a die made by the above-described making method of the embodiments.

According to the embodiments, displacement of the object relative to the laser light source is calculated on the basis of the difference between outputs of the first photodetector and the second photodetector which have received the first and second laser beams, respectively, thus reducing measurement errors based on the light quantity stability, light quantity distribution, and optical axis deflection of the laser beam emitted from the laser light source.

Further features of the embodiments will become apparent from the following description of exemplary embodiments with reference to the attached drawings.

BRIEF DESCRIPTION OF THE DRAWINGS

FIG. 5 is a perspective view of a cutter, serving as an object to be measured by the displacement measuring apparatus according to any of the embodiments.

FIG. 6 is a flow diagram illustrating a process to measure the displacement of an object according to one aspect of the embodiments.

DESCRIPTION OF THE EMBODIMENTS

Embodiments of the present invention will be described below in detail with reference to the drawings. One disclosed feature of the embodiments may be described as a process which is usually depicted as a flowchart, a flow diagram, a timing diagram, a structure diagram, or a block diagram.

Although a flowchart or a timing diagram may describe the operations or events as a sequential process, the operations may be performed, or the events may occur, in parallel or concurrently. An operation in a flowchart may be optional. In addition, the order of the operations or events may be rearranged. A process is terminated when its operations are completed. A process may correspond to a method, a program, a procedure, a method of manufacturing or fabrication, a sequence of operations performed by an apparatus, a machine, or a logic circuit, etc.

Figure 1:
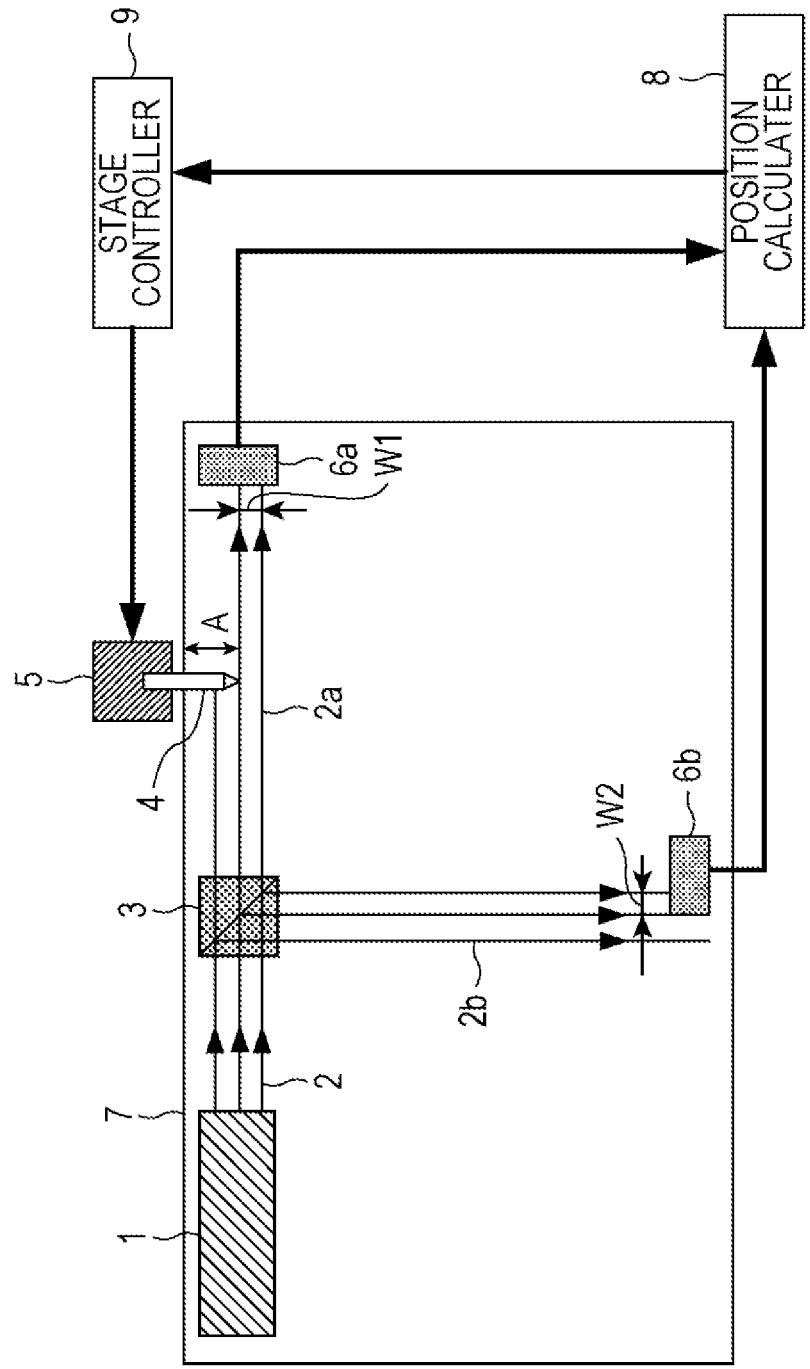
FIG. 1 is a diagram illustrating a configuration of a displacement measuring apparatus according to a first embodiment.

FIG. 1 illustrates a configuration of a displacement measuring apparatus according to a first embodiment. Referring to FIG. 1, a laser beam source 1 emits a laser beam 2 having a diameter of 3 mm. A beam splitter 3 splits the laser beam 2 into two laser beams 2a and 2b. A drive stage 5 is used to fix an object 4, such as a tool. This drive stage 5 may be moved in a direction in which the object 4 blocks the laser beam (hereinafter, referred to as a "first laser beam") 2a, one of the two laser beams.

A first photodetector 6a is disposed downstream of the object 4 in a direction in which the laser beam is emitted. The first laser beam 2a leaving the beam splitter 3 is partially blocked by the object 4 and then impinges on the first photodetector 6a. The first photodetector 6a measures the light quantity of the incident first laser beam 2a.

A second photodetector 6b receives the laser beam (hereinafter, referred to as a "second laser beam") 2b, which is one of the two laser beams and travels in a direction different from the traveling direction of the first laser beam 2a, and measures the light quantity of the second laser beam 2b. The second photodetector 6b is disposed such that the second laser beam 2b received by the second photodetector 6b and the first laser beam 2a unblocked at the position of the object 4 correspond to the same part of the laser beam 2 before being split. The laser beam source 1, the beam splitter 3, and the first and second photodetectors 6a and 6b are secured to a base 7.

A position calculator 8 functions as a calculating unit configured to calculate the position of the object 4 on the basis of outputs of the first and second photodetectors 6a and 6b. A stage controller 9 controls a driving unit (not illustrated) for moving the drive stage 5 in the direction, indicated by an arrow A, in which the first laser beam 2a is blocked. The stage controller 9 controls the amount of driving by the driving unit (not illustrated) on the basis of an output from the position calculator 8.

A method for measuring displacement according to the present embodiment and a method of driving the drive stage 5 will now be described. In the present embodiment, displacement of the object 4 is measured by measurement of a change in output at a position where the object 4 has blocked a certain quantity (e.g., approximately 50%) of the first laser beam 2a, or the position of the object 4 relative to the first laser beam 2a.

Determination of a position where the object 4 has blocked approximately 50% of the first laser beam 2a will be described below. The reason for such determination is that since the laser beam 2 has Gaussian distribution, the highest sensitivity is obtained at the position where the object 4 has blocked approximately 50% of the first laser beam 2a. In this case, the second photodetector 6b is also positioned such that approximately 50% of the second laser beam 2b passes outside the photodetector.

In other words, the installation position of the second photodetector 6b is a position where a width W1 of the first laser beam 2a, blocked by the object 4, incident on the first photodetector 6a is equal to a width W2 of the second laser beam 2b incident on the second photodetector 6b. Specifically, the second photodetector 6b is positioned such that the light quantity of part of the second laser beam 2b incident on the second photodetector 6b is equal to that of part of the first laser beam 2a incident on the first photodetector 6a.

Let C denotes a coefficient of measurement error based on the light quantity stability of the laser beam 2, let D denote a coefficient of measurement error based on the optical axis deflection of the laser beam 2, and let Lb1 denote the distance between the laser light source 1 and the second photodetector 6b. A light quantity output Vb (%) that represents the quantity of light received by the second photodetector 6b is expressed by the following equation. Since the measurement error coefficient D is an error based on angular deflection of the laser beam 2 emitted from the laser light source 1, the product of the coefficient D and the distance Lb1 affects the light quantity output Vb (%). The distance Lb1 is known because it is a design value.

$$Vb(\%) = C \times (50 \pm D \times Lb1) \qquad (1)$$

As described above, the light quantity output Vb (%) of the second photodetector 6b is affected by the light quantity stability, light quantity distribution, and optical axis deflection of the laser beam 2. Accordingly, measuring the light quantity output Vb (%) of the second photodetector 6b enables measurement of the light quantity stability, light quantity distribution, and optical axis deflection of the laser beam 2 emitted from the laser beam source 1.

Let La1 denote the distance between the laser light source 1 and the first photodetector 6a and let X denote a variation in light quantity caused by light blockage with the object 4 during movement of the drive stage 5. A light quantity output Va (%) that represents the quantity of light received by the first photodetector 6a is expressed by the following equation. The distance La1 is known because it is a design value.

$$Va(\%) = C \times (X \pm D \times La1) \qquad (2)$$

In the case where the light quantity stability and light quantity distribution of the laser beam 2 emitted from the laser light source 1 are good and the optical axis thereof is not deflected, a value Vb is equal to a value Va. If the light quantity stability and light quantity distribution of the laser beam 2 are poor and the optical axis thereof is deflected, the value Vb will differ from the value Va. In the case where the value Vb differs from the value Va, the drive stage 5 is moved such that the value Va is equal to the value Vb.

The above-described movement of the drive stage 5 such that the value Va is equal to the value Vb allows determination of the position where the object 4 blocks approximately 50% of the first laser beam 2a. In the case where the measurement error coefficient C based on the light quantity stability is high, normalization may be performed and the drive stage 5 may be moved such that Va/Vb is 1. In the case where the measurement error coefficient D based on the optical axis deflection is high, subtraction may be performed and the drive stage 5 may be moved such that (Va−Vb) is 0.

As described above, in the present embodiment, the laser beam 2 is split into two laser beams and the second laser beam 2b, serving one of the two laser beams, is received by the second photodetector 6b. The position where the object 4 has blocked the first laser beam 2a is determined on the basis of the light quantity output Vb (%) of the second photodetector 6b.

Consequently, the position where the object 4 has blocked the first laser beam 2a may be determined after reduction of the effects of the light quantity, light quantity distribution, and optical axis deflection of the laser beam 2. The determination of the position where the object 4 has blocked the first laser beam 2a after reduction of the effects of the light quantity of the laser beam 2 and the like allows accurate measurement of displacement of the object 4.

Furthermore, the displacement of the object 4 is accurately measured and the stage controller 9 controls the amount of driving by the driving unit on the basis of the determined position, so that the object 4 may be moved to an intended position, for example, the position where the object 4 blocks approximately 50% of the first laser beam 2a. In other words, the object 4 is moved such that the light quantity of the first laser beam 2a associated with a target position of the object 4 is equal to that of the second laser beam 2b, so that the object 4 may be moved to the intended position.

As described above, displacement of the object 4 relative to the laser light source 1 is calculated on the basis of the difference between outputs of the first and second photodetectors 6a and 6b which have received the first and second laser beams, so that measurement errors based on the light quantity stability, light quantity distribution, and optical axis deflection of the laser beam 2 may be reduced.

Figure 2:
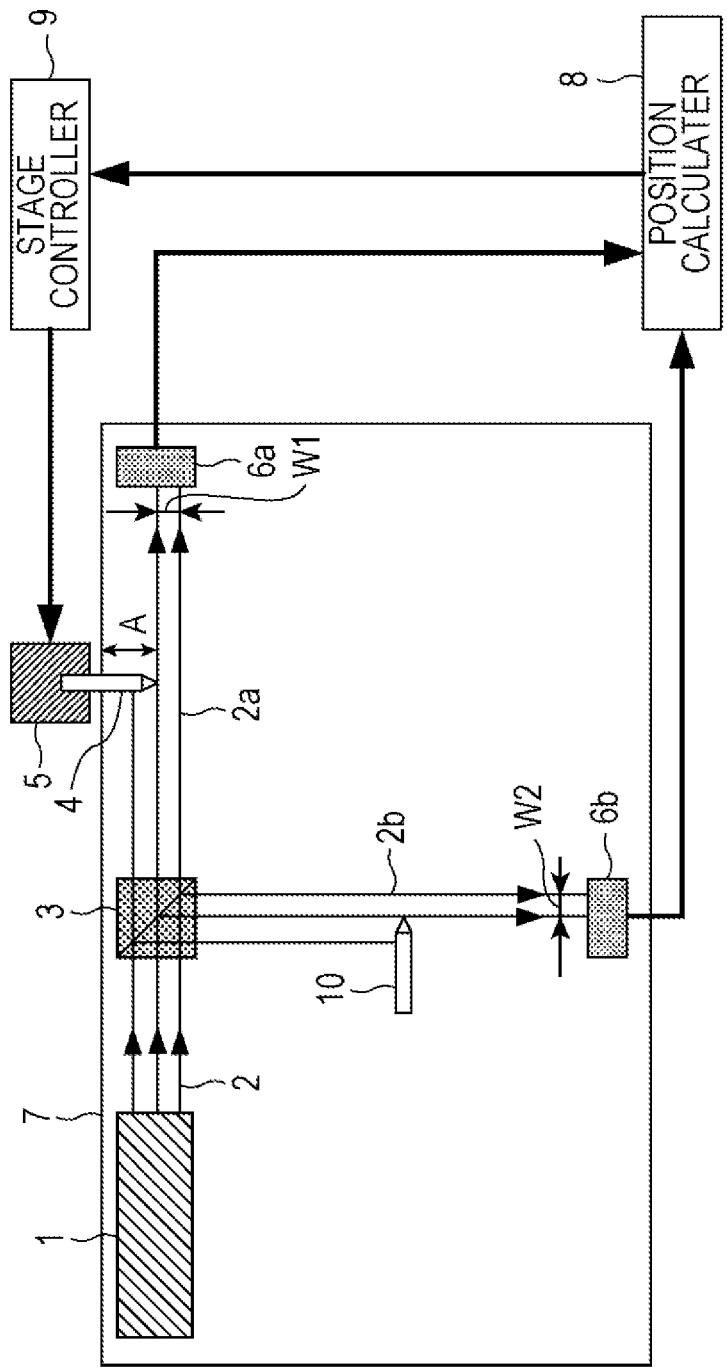
FIG. 2 is a diagram illustrating a configuration of a displacement measuring apparatus according to a second embodiment.

A second embodiment will now be described. FIG. 2 illustrates a configuration of a displacement measuring apparatus according to the present embodiment. In FIG. 2, the same reference numerals as those in FIG. 1 denote the same or equivalent components.

Referring to FIG. 2, a knife edge 10, serving as an obstruction that blocks the second laser beam 2b, is disposed between the beam splitter 3 and the second photodetector 6b. The knife edge 10 is disposed such that only part of the second laser beam 2b impinges on the second photodetector 6b, the part having the same optical axis as that of unblocked part of the first laser beam 2a at the position of the object 4 before the laser beam 2 is split. The laser light source 1, the beam splitter 3, the first and second photodetectors 6a and 6b, and the knife edge 10 are secured to the base 7.

A method of measuring displacement according to the present embodiment and a method of driving the drive stage 5 will now be described. In the present embodiment, displacement is measured in a manner similar to the foregoing first embodiment, namely, by measurement of a position where the object 4 has blocked a certain quantity of the first laser beam 2a, or a position of the object 4 relative to the first laser beam 2a.

Determination of a position where the object 4 has blocked approximately 50% of the first laser beam 2a will be described below. In the case where C denotes the measurement error coefficient based on the light quantity stability, D denotes the measurement error coefficient based on the optical axis deflection, and let Lb2 denote the distance between the laser light source 1 and the knife edge 10, the light quantity output Vb (%) of the second photodetector 6b is expressed by the following equation. Since the measurement error coefficient D is an error based on angular deflection of the laser beam 2 emitted from the laser light source 1, the product of the coefficient D and the distance Lb2 affects the light quantity output Vb (%). The distance Lb2 is known because it is a design value.

$$Vb(\%) = C \times (50 \pm D \times Lb2) \quad (3)$$

In other words, the light quantity output Vb (%) of the second photodetector 6b is affected by the light quantity stability, light quantity distribution, and optical axis deflection of the laser beam 2. Accordingly, measuring the light quantity output Vb (%) of the second photodetector 6b enables measurement of the light quantity stability, light quantity distribution, and optical axis deflection of the laser beam 2.

Let La2 denote the distance between the laser light source 1 and the object 4 and X denotes a variation in light quantity caused by light blockage with the object 4 during movement of the drive stage 5. The light quantity output Va (%) of the first photodetector 6a is expressed by the following equation. The distance La2 is known because it is a design value.

$$Va(\%) = C \times (X \pm D \times La2) \quad (4)$$

To determine the position where the object 4 has blocked approximately 50% of the first laser beam 2a, the drive stage 5 may be moved such that the light quantity output Va (%) of the first photodetector 6a is equal to the light quantity output Vb (%) of the second photodetector 6b. In the case where the measurement error coefficient C based on the light quantity stability is high, normalization may be performed and the drive stage 5 may be moved such that Va/Vb is 1. In the case where the measurement error coefficient D based on the optical axis deflection is high, subtraction may be performed and the drive stage 5 may be moved such that (Va−Vb) is 0.

As described above, in the present embodiment, the second laser beam 2b passed by the knife edge 10 is received by the second photodetector 6b and a position where the object 4 has blocked the first laser beam 2a is determined on the basis of the light quantity output Vb (%) of the second photodetector 6b. Consequently, the position where the object 4 has blocked the first laser beam 2a may be determined after reduction of the effects of the light quantity, light quantity distribution, and optical axis deflection of the laser beam 2. Furthermore, since the knife edge 10 is used, the second laser beam 2b may be blocked with a simple configuration such that the second laser beam 2b blocked by the knife edge 10 and the first laser beam 2a blocked by the object 4 correspond to the same part of the laser beam 2 before being split.

Figure 3:
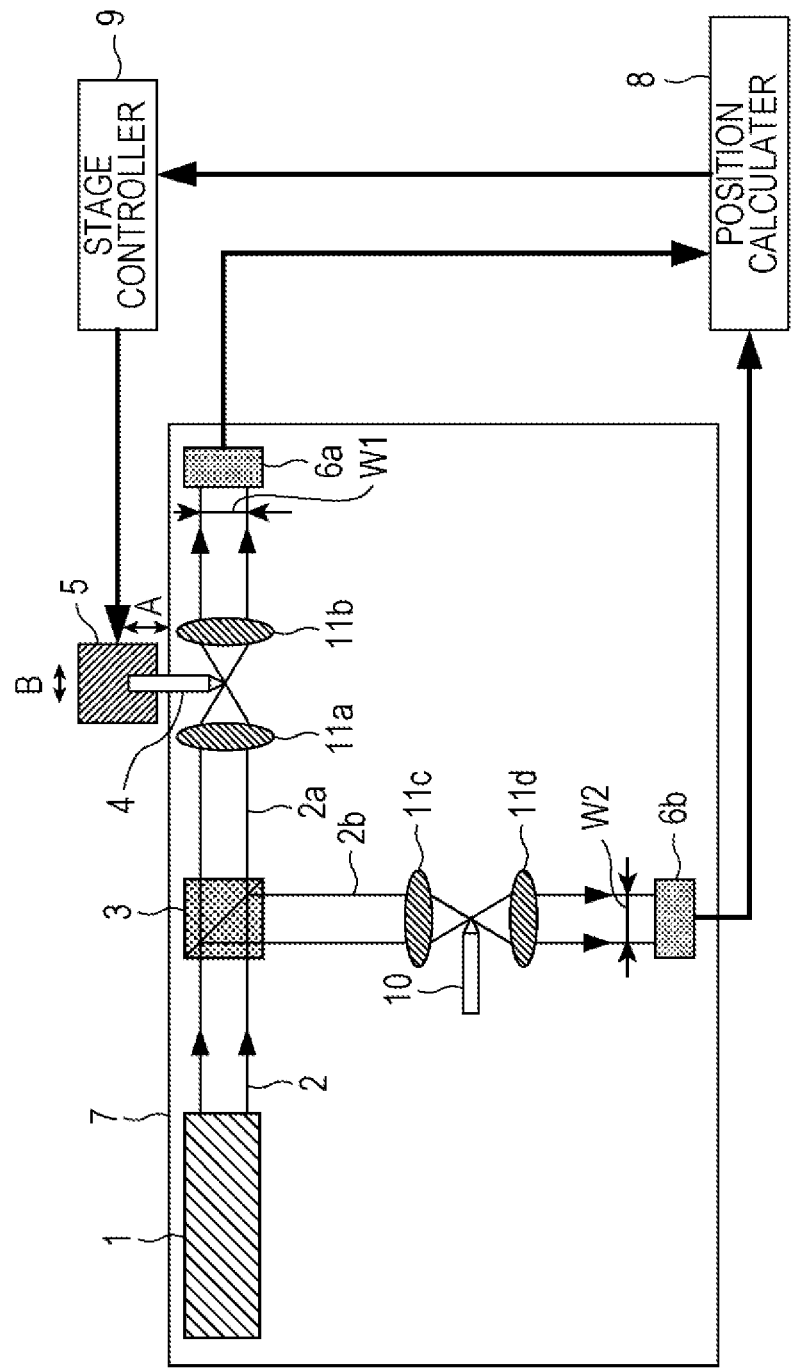
FIG. 3 is a diagram illustrating a configuration of a displacement measuring apparatus according to a third embodiment.

A third embodiment will now be described. FIG. 3 illustrates a configuration of a displacement measuring apparatus according to the present embodiment. In FIG. 3, the same reference numerals as those in FIG. 2 denote the same or equivalent components.

Referring to FIG. 3, condenser lenses 11a to 11d having the same focal length are arranged on optical paths of the first and second laser beams 2a and 2b and constitute a condenser optical system. In the present embodiment, the drive stage 5 may be moved in the direction, indicated by the arrow A, in which the object 4 blocks the first laser beam 2a and in a direction, indicated by an arrow B, along the optical axis of the first laser beam 2a.

The knife edge 10 is secured at the focal point of the condenser lens 11c in the direction along the optical axis of the second laser beam 2b. The laser light source 1, the beam splitter 3, the first and second photodetectors 6a and 6b, the knife edge 10, and the condenser lenses 11a to 11d are secured to the base 7.

A method of measuring displacement according to the present embodiment and a method of driving the drive stage 5 will now be described. First, the drive stage 5 is driven to move the object 4 to the focal point of the condenser lens 11a in the direction along the optical axis of the first laser beam 2a. Whether the object 4 has reached the focal point of the condenser lens 11a is determined on the basis of the light quantity output Va (%) of the first photodetector 6a.

For example, in the case where the quantity of light blocked by the object 4 is less than approximately 50%, the highest light quantity output Va (%) is obtained at the focal point during movement of the object 4 in the direction along the optical axis of the first laser beam 2a. Accordingly, moving the object 4 to the position where the highest light quantity output Va (%) is obtained allows movement of the object 4 to the focal point of the condenser lens 11a.

After the object 4 is placed at the focal point of the condenser lens 11a in the direction along the optical axis of the first laser beam 2a as described above, the light quantity output Vb (%) of the second photodetector 6b is measured, thus determining a position where the object 4 has blocked the first laser beam 2a. In the case where C denotes the measurement error coefficient based on the light quantity stability, D denotes the measurement error coefficient based on the optical axis deflection, and Lb2 denotes the distance between the laser light source 1 and the knife edge 10, the light quantity output Vb (%) of the second photodetector 6b is expressed by the following equation.

$$Vb(\%)=C\times(50\pm D\times Lb2) \quad (3)$$

In other words, the light quantity output Vb (%) of the second photodetector 6b is affected by the light quantity stability, light quantity distribution, and optical axis deflection of the laser beam 2. Accordingly, measuring the light quantity output Vb (%) of the second photodetector 6b enables measurement of the light quantity stability, light quantity distribution, and optical axis deflection of the laser beam 2.

In the case where La2 denotes the distance between the laser light source 1 and the object 4 and X denotes a variation in light quantity caused by light blockage with the object 4 during movement of the drive stage 5, the light quantity output Va (%) of the first photodetector 6a is expressed by the following equation. The distance La2 is known because it is a design value.

$$Va(\%)=C\times(X\pm D\times La2) \quad (4)$$

Since the position where the object 4 has blocked approximately 50% of the first laser beam 2a is intended to be determined in the present embodiment, the drive stage 5 is moved such that the light quantity output Va (%) of the first photodetector 6a is equal to the light quantity output Vb (%) of the second photodetector 6b.

In the case where the measurement error coefficient C based on the light quantity stability is high, normalization may be performed and the drive stage 5 may be moved such that Va/Vb is 1. In the case where the measurement error coefficient D based on the optical axis deflection is high, subtraction may be performed and the drive stage 5 may be moved such that (Va−Vb) is 0.

As described above, in the present embodiment, the second laser beam 2b is received by the second photodetector 6b and a position where the object 4 has blocked the first laser beam 2a is determined on the basis of the light quantity output Vb (%) of the second photodetector 6b. Consequently, the position where the object 4 has blocked the first laser beam 2a may be determined after reduction of the effects of the light quantity, light quantity distribution, and optical axis deflection of the laser beam 2. Furthermore, since the first laser beam 2a is focused on the position of the object 4 and the second laser beam 2b is focused on the position of the knife edge 10, the position where the object 4 has blocked the first laser beam 2a may be determined with higher accuracy.

Figure 4:
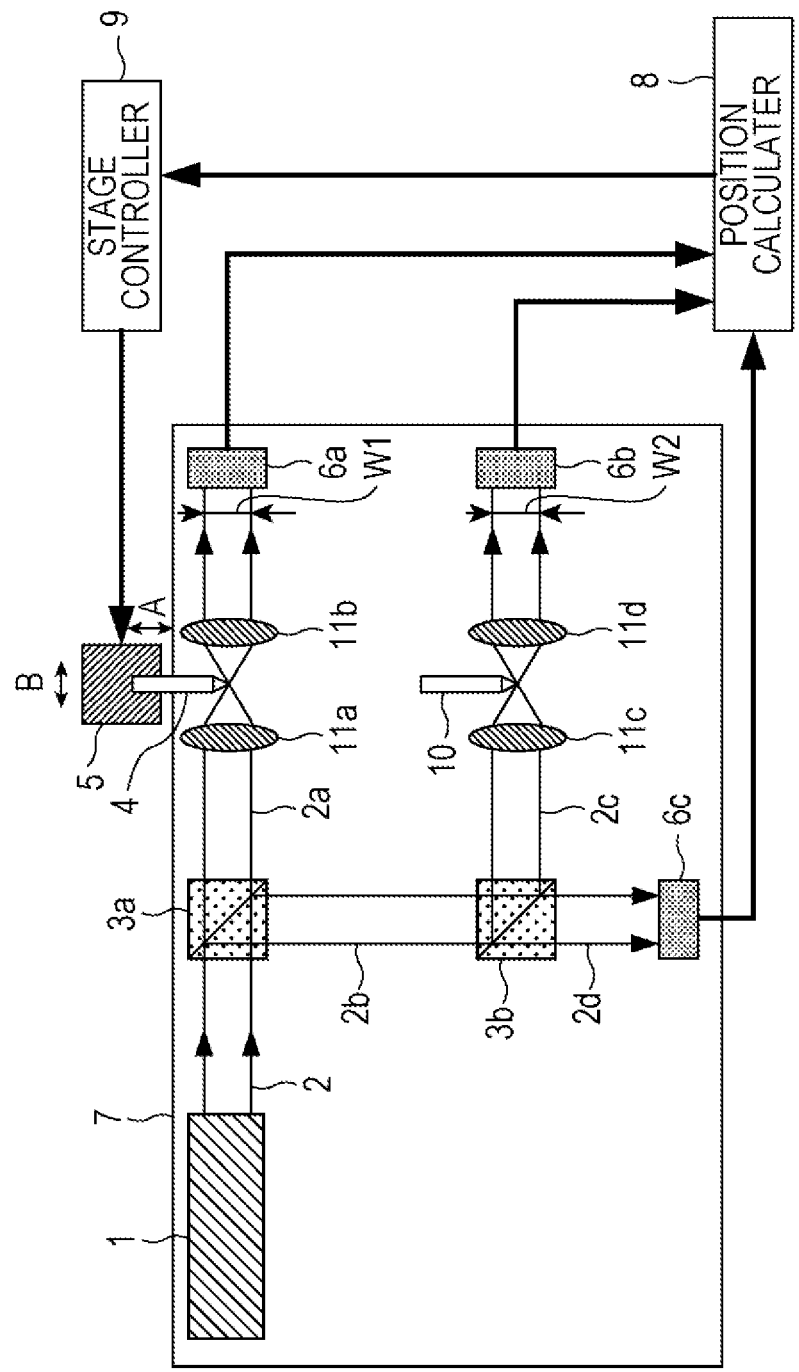
FIG. 4 is a diagram illustrating a displacement measuring apparatus according to a fourth embodiment.

A fourth embodiment will now be described. FIG. 4 illustrates a configuration of a displacement measuring apparatus according to the present embodiment. In FIG. 4, the same reference numerals as those in FIG. 3 denote the same or equivalent components.

Referring to FIG. 4, a first beam splitter 3a splits the laser beam 2 into the first laser beam 2a whose light quantity is 33% of that of the laser beam 2 and the second laser beam 2b whose light quantity is 66% of that of the laser beam 2. A second beam splitter 3b splits the second laser beam 2b into two laser beams 2c and 2d. In the present embodiment, a half mirror is used as the second beam splitter 3b.

The first laser beam 2a is partially blocked by the object 4. The first photodetector 6a measures the light quantity of the partially blocked first laser beam 2a. The second photodetector 6b measures the light quantity of the laser beam (hereinafter, referred to as a "third laser beam") 2c, one of the two laser beams leaving the second beam splitter 3b.

The knife edge 10 is disposed such that the third laser beam 2c received by the second photodetector 6b and the first laser beam 2a unblocked at the position of the object 4 correspond to the same part of the laser beam 2 before being split. In the present embodiment, the knife edge 10 is secured at the focal point of the condenser lens 11c in the direction along the optical axis of the third laser beam 2c, namely, the position where approximately 50% of the third laser beam 2c is unblocked.

As regards the laser beam (hereinafter, referred to as a "fourth laser beam") 2d, the other of the two laser beams leaving the second beam splitter 3b, the light quantity is measured by a third photodetector 6c. The laser light source 1, the first and second beam splitters 3a and 3b, the first to third photodetectors 6a to 6c, the knife edge 10, and the condenser lenses 11a to 11d are secured to the base 7.

In the present embodiment, the position of the object 4 is calculated on the basis of outputs of the first to third photodetectors 6a to 6c. A method of measuring displacement according to the present embodiment and a method of driving the drive stage 5 will now be described.

First, the drive stage 5 is driven to move the object 4 to the focal point of the condenser lens 11a, as indicated by the arrow B, in the direction along the optical axis of the first laser beam 2a. The focal point of the condenser lens 11a is determined on the basis of the light quantity output Va of the first photodetector 6a. For example, in the case where the quantity of light blocked by the object 4 is less than approximately 50%, the highest light quantity output Va is obtained at the focal point during movement of the object 4 in the direction along the optical axis of the first laser beam 2a.

After the object 4 is placed at the focal point of the condenser lens 11a in the direction along the optical axis of the first laser beam 2a as described above, a position where the object 4 blocks the first laser beam 2a is determined.

In the case where C denotes the measurement error coefficient based on the light quantity stability, D denotes the measurement error coefficient based on the optical axis deflection, and Lb2 denotes the distance between the laser light source 1 and the knife edge 10, the light quantity output Vb (%) of the second photodetector 6b is expressed by the following equation. Since the measurement error coefficient D is an error based on angular deflection of the laser beam 2 emitted from the laser light source 1, the product of the coefficient D and the distance Lb2 affects the light quantity output Vb (%). The distance Lb2 is known because it is a design value.

$$Vb(\%)=C\times(50\pm D\times Lb2) \quad (3)$$

In the case where La2 denotes the distance between the laser light source 1 and the object 4 and X denotes a variation in light quantity caused by light blockage with the object 4 during movement of the drive stage 5, the light quantity output Va (%) of the first photodetector 6a is expressed by the following equation. The distance La2 is known because it is a design value.

$$Va(\%)=C\times(X\pm D\times La2) \quad (4)$$

Since the light quantity of the fourth laser beam 2d is 33% of that of the laser beam 2 emitted from the laser light source 1, a light quantity output Vc (%) of the photodetector 6c is expressed by the following equation.

$$Vc(\%) = C \times 33 \qquad (5)$$

In the present embodiment, the position where the object 4 has blocked approximately 50% of the first laser beam 2a is determined. Accordingly, the drive stage 5 is moved such that the light quantity output Va of the first photodetector 6a is equal to the light quantity output Vb of the second photodetector 6b.

In this case, since the measurement error coefficient C based on the light quantity stability may be determined using Equation (9), the light quantity outputs Va and Vb are first normalized, thus correcting a variation in light quantity. Subsequently, the drive stage 5 is moved such that the difference (Va–Vb) between the light quantity outputs Va and Vb is 0.

As described above, in the present embodiment, the measurement error coefficient C indicating the light quantity stability is determined using the third photodetector 6c and the output Vb of the second photodetector 6b is corrected on the basis of the determined measurement error coefficient C. Consequently, the light quantity stability, light quantity distribution, and optical axis deflection of the laser beam 2 emitted from the laser light source 1 may be corrected. Furthermore, the light quantity output Va of the first photodetector 6a is corrected on the basis of the corrected output Vb of the second photodetector 6b, so that the position where the object 4 has blocked the first laser beam 2a may be determined with higher accuracy.

As described above, in the present embodiment, the measurement error coefficient C indicating the light quantity stability is determined using the third photodetector 6c and the light quantity outputs Va and Vb of the first and second photodetectors 6a and 6b are corrected on the basis of the determined measurement error coefficient C. Thus, the light quantity stability and optical axis deflection of the first laser beam 2a may be separately corrected. Moreover, since the light beams are focused on the positions of the object 4 and the knife edge 10, respectively, measurement resolutions of the light quantity stability, light quantity distribution, and optical axis deflection of the laser beam 2 may be increased, such that the position may be determined with higher accuracy.

As regards a specific application of the displacement measuring apparatus according to each of the embodiments, this apparatus may be used as a shape determining apparatus for determining the shape of the object 4. Examples of the object 4, serving as a target to be measured, include a cutter 23 as illustrated in FIG. 5. The cutter 23 includes a shank 24 and a diamond bit 25 fixed to the shank 24. A workpiece is cut by a cutting edge 26 of the diamond bit 25. In processes other than single-point machining, the shape of the cutting edge 26 affects a result of processing. If the accuracy of form of the cutting edge 26 is low, the accuracy of form of a workpiece will be lowered. However, since the diamond bit 25 is difficult to process, it is difficult to process the cutting edge 26 with high accuracy. The shape of the cutting edge 26 is therefore determined using any of the methods according to the embodiments and an error in the shape of the cutting edge 26 is corrected on the basis of a processing program, thus achieving highly accurate processing.

According to such a method of determination, while the drive stage 5 is being driven under the control of the stage controller 9 such that the light quantity of the laser beam 2a blocked by the cutting edge 26 is equal to the light quantity of the laser beam 2b blocked, the cutting edge 26 of the cutter 23, serving as the object 4, is scanned. Specifically, the stage controller 9 maintains the quantity of light blocked by the cutting edge 26 at a constant value by moving the cutter 23 such that the light quantity output, which indicates an unblocked light quantity, of the first photodetector 6a is equal to that of the second photodetector 6b, and the cutting edge 26 is scanned with the laser beam 2a. In this case, the history of movement of the cutting edge 26 represents the shape of the cutting edge 26. Thus, the shape of the cutting edge 26 is determined. According to another method of determination, the stage may be moved along the design shape of the cutting edge 26 of the cutter 23, serving as the object 4, to determine the difference between the design shape and an actual shape on the basis of a change in quantity of blocked light (or unblocked light). As described above, the shape of the cutting edge 26 is determined on the basis of the result of movement of the cutting edge 26.

The shape of the cutting edge determined as described above may be used suitably for, for example, a cutting process that requires high accuracy of form. The cutter determined with high accuracy as described above may be used to make a die for molding an optical element, such as a plastic lens or a glass lens. The die for molding an optical element is made by a known method, i.e., cutting the die while the cutting edge of the cutter and the die are moved relative to each other on the basis of a processing program. A related-art processing program for shaping a die, serving as a workpiece, into intended form while the cutting edge of a cutter and the die are moved relative to each other has been created on the basis of the defined position of the cutting edge of the cutter and the defined position of the workpiece. The position of the cutting edge of the cutter is defined on the basis of, for example, the design shape of the cutting edge of the cutter. If the shape of the cutting edge of the cutter used in an actual process differs from the design shape, an error in the shape of the cutting edge will cause a processing error, thus affecting the accuracy of processing a workpiece. Data regarding the shape of the cutting edge obtained by the apparatus or method for measuring displacement according to any of the embodiments may be used to create the processing program such that an error in the shape of the cutting edge that may affect processing of a die may be markedly reduced. Thus, the accuracy of processing a die may be increased. Furthermore, the accuracy of form of an optical element molded using this die may be increased.

FIG. 6 is a flow diagram illustrating a process 600 to measure the displacement of an object according to one aspect of the embodiments.

Upon START, the process 600 splits a laser beam emitted from a laser light source into a first laser beam and a second laser beam (Operation 610). The first laser beam travels toward the object in a first direction. The second laser beam travels in a second direction different from the first direction through a beam splitter disposed between the laser light source and the object.

Next, the process 600 may move the object to a position where the output of a first photodetector is equal to that of a second photodetector in a direction in which the object blocks the first laser beam traveling toward the first photodetector (Operation 620). An obstruction may be disposed between the beam splitter and the second photodetector such that the light quantity of the first laser beam at a target position of the object is equal to that of the second laser beam. The second photodetector may be disposed such that the light quantity of the first laser beam at a target position of the object is equal to that of the second laser beam.

Then, the process 600 measures displacement of the object on the basis of an output of the first photodetector which has received the first laser beam blocked by the object and an output of the second photodetector which has received the second laser beam (Operation 630).

Next, the process 600 splits the second laser beam into a third laser beam and a fourth laser beam (Operation 640). The third laser beam travels toward the second photodetector in a third direction. The fourth laser beam travels in a fourth direction different from the third direction through a second beam splitter disposed on the optical path of the second laser beam. The fourth laser beam leaving the second beam splitter is received by a third photodetector.

Then, the process 600 corrects the output of the first photodetector and the output of the second photodetector on the basis of an output of the third photodetector (Operation 650). The displacement of the object relative to the laser light source may be measured on the basis of the corrected outputs of the first photodetector and the second photodetector. The object may be a cutter and the shape of the cutting edge of the cutter is determined. The process 600 is then terminated.

While the embodiments have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-003581 filed Jan. 12, 2011, which is hereby incorporated by reference herein in its entirety.

What is claimed is:

1. A displacement measuring apparatus for measuring displacement of an object, comprising:
    a laser light source;
    a beam splitter disposed between the laser light source and the object, the beam splitter being configured to split a laser beam emitted from the laser light source into a first laser beam that travels toward the object in a first direction and a second laser beam that travels in a second direction different from the first direction;
    a first photodetector configured to receive the first laser beam;
    a second photodetector configured to receive the second laser beam; and
    a calculating unit configured to calculate displacement of the object on the basis of an output of the first photodetector which has received the first laser beam blocked by the object and an output of the second photodetector which has received the second laser beam not blocked by the object.

2. The apparatus according to claim 1, further comprising:
    an obstruction disposed between the beam splitter and the second photodetector, the obstruction being configured to block the second laser beam such that the blocked second laser beam and the first laser beam blocked by the object correspond to the same part of the laser beam before being split in order to make the light quantity of the first laser beam at a target position of the object equal to that of the second laser beam.

3. The apparatus according to claim 2, further comprising:
    a first condenser lens disposed on the optical path of the first laser beam, the first condenser lens being configured to focus the first laser beam on the position of the object; and
    a second condenser lens disposed on the optical path of the second laser beam, the second condenser lens being configured to focus the second laser beam on the position of the obstruction.

4. The apparatus according to claim 1, wherein the second photodetector is disposed such that the second laser beam received by the second photodetector and the first laser beam received by the first photodetector correspond to the same part of the laser beam before being split in order to make the light quantity of the first laser beam at a target position of the object equal to that of the second laser beam.

5. The apparatus according to claim 1, further comprising:
    a second beam splitter disposed on the optical path of the second laser beam, the second beam splitter being configured to split the second laser beam into a third laser beam that travels toward the second photodetector in a third direction and a fourth laser beam that travels in a fourth direction different from the third direction; and
    a third photodetector configured to receive the fourth laser beam leaving the second beam splitter, wherein
    the calculating unit corrects the output of the first photodetector and the output of the second photodetector on the basis of an output of the third photodetector, and calculates displacement of the object relative to the laser light source on the basis of the corrected outputs of the first photodetector and the second photodetector.

6. The apparatus according to claim 1, further comprising:
    a driving unit configured to move the object in a direction in which the object blocks the first laser beam traveling toward the first photodetector, wherein
    the driving unit is controlled on the basis of the calculated displacement of the object such that the object is moved to a position where the output of the first photodetector is equal to that of the second photodetector.

7. A method of measuring displacement of an object, the method comprising:
    splitting a laser beam emitted from a laser light source into a first laser beam that travels toward the object in a first direction and a second laser beam that travels in a second direction different from the first direction through a beam splitter disposed between the laser light source and the object; and
    measuring displacement of the object on the basis of an output of a first photodetector which has received the first laser beam blocked by the object and an output of a second photodetector which has received the second laser beam not blocked by the object.

8. The method according to claim 7, wherein an obstruction is disposed between the beam splitter and the second photodetector such that the light quantity of the first laser beam at a target position of the object is equal to that of the second laser beam.

9. The method according to claim 7, wherein the second photodetector is disposed such that the light quantity of the first laser beam at a target position of the object is equal to that of the second laser beam.

10. The method according to claim 7, further comprising:
    splitting the second laser beam into a third laser beam that travels toward the second photodetector in a third direction and a fourth laser beam that travels in a fourth direction different from the third direction through a second beam splitter disposed on the optical path of the second laser beam, the fourth laser beam leaving the second beam splitter being received by a third photodetector; and correcting the output of the first photodetector and the output of the second photodetector on the basis of an output of the third photodetector, wherein displacement of the object relative to the laser light source is measured on the basis of the corrected outputs of the first photodetector and the second photodetector.

11. The method according to claim 7, further comprising:

prior to measuring displacement of the object, moving the object to a position where the output of the first photodetector is equal to that of the second photodetector in a direction in which the object blocks the first laser beam traveling toward the first photodetector.

12. The method according to claim 7, wherein the object is a cutter and the shape of the cutting edge of the cutter is determined.

13. A method of making a die for molding an optical element by cutting the die while moving the die and the cutting edge of a cutter relative to each other on the basis of a processing program, the method comprising:

creating the processing program on the basis of the shape of the cutting edge of the cutter determined by the method according to claim 12; and cutting the die while moving the die and the cutter relative to each other on the basis of the created processing program.

14. An optical element molded using the die made by the method according to claim 13.

\* \* \* \* \*